INVENTOR.
E. CLIFFORD POTTER

March 9, 1971
E. C. POTTER
3,568,320
ARCHITECTURAL SHADOW INDICATOR
Filed March 12, 1969
3 Sheets-Sheet 2
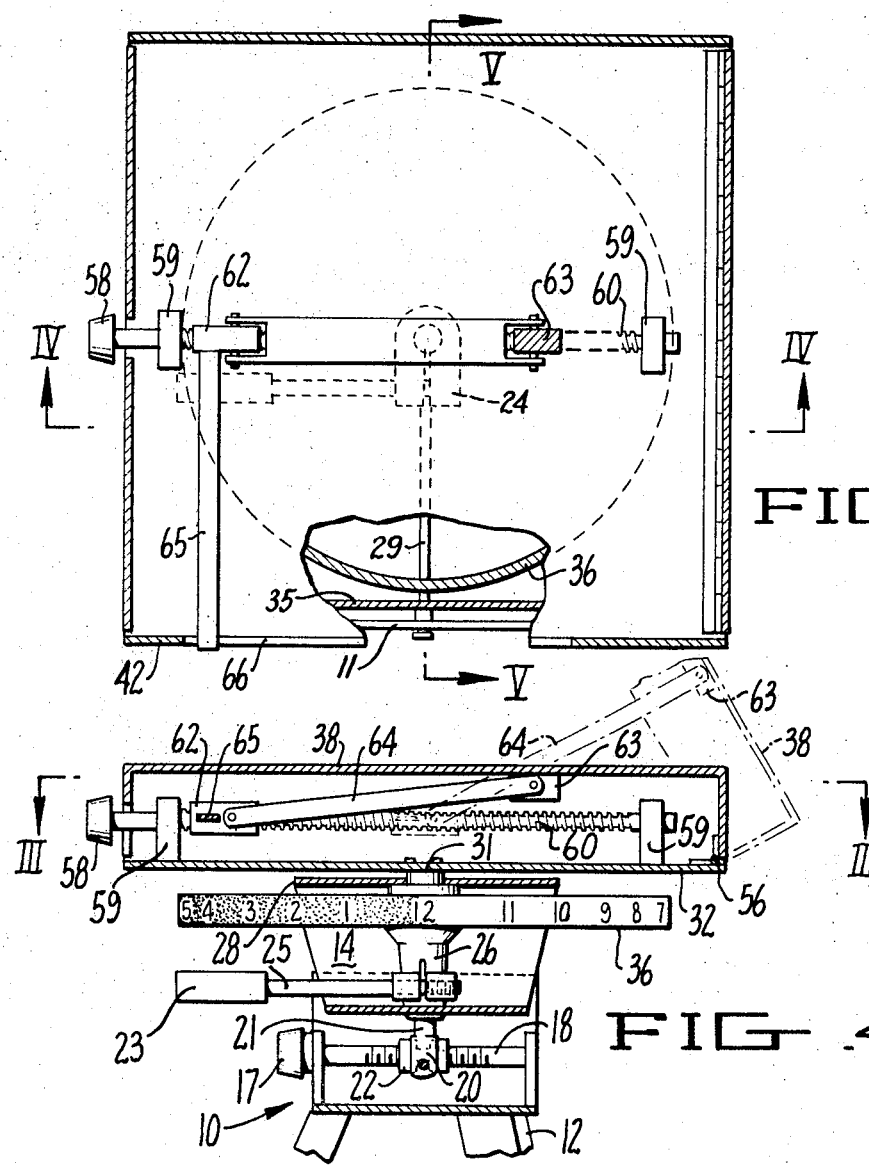
FIG. 3.
FIG. 4.
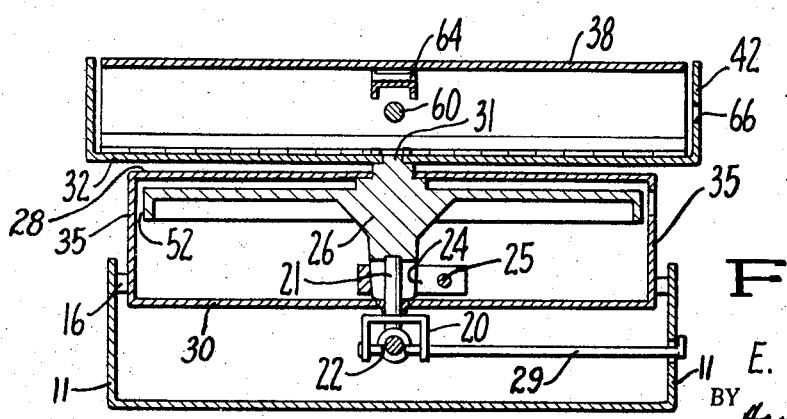
FIG. 5.
INVENTOR.
E. CLIFFORD POTTER March 9, 1971  E. C. POTTER  3,568,320
ARCHITECTURAL SHADOW INDICATOR Filed March 12, 1969  3 Sheets-Sheet 3

INVENTOR.
E. CLIFFORD POTTER
BY

United States Patent Office 3,568,320
Patented Mar. 9, 1971

3,568,320
ARCHITECTURAL SHADOW INDICATOR
Eugene Clifford Potter, 101 Walnut St.,
San Francisco, Calif. 94118
Filed Mar. 12, 1969, Ser. No. 806,462
Int. Cl. G01c 1/00
U.S. Cl. 33—1                        6 Claims

ABSTRACT OF THE DISCLOSURE

There is disclosed an architectural shadow indicating apparatus, sometime referred to as a heliodon, which affords a compact and precise instrument for accurately showing the shadow pattern cast by a fixed light source representing the sun, on a structural model. The cast shadow can be determined for any hour of the day at any position of latitude and at any point in the seasonal inclination of the earth.

BACKGROUND OF THE INVENTION

This invention relates to an apparatus which permits a given structural and other models to be exposed to a fixed light source simulating the sun in any desired position of adjustment with relation to the light source, including seasonal, latitudinal and hourly inputs, with an extremely high degree of precision. This instrument provides quick and accurate means of studying shadow effects and contours which heretofore could only be approximated by laborious calculation. Such approximations are not sufficient for present day requirements. With existing forms of apparatus intended for this same purpose, various of these adjustments can be made only in a relatively imprecise fashion as an approximation and they are subject to error depending upon the judgment of the individual operator. Many of the units presently available are slightly more than toys. It it an object of this invention to overcome these deficiencies while at the same time providing an apparatus which is accurate and reliable having the advantages of a compact and sturdy construction adapting it to be easily transported and to be used indefinitely without repair or other servicing.

SUMMARY OF THE INVENTION

In carrying out this invention, a frame member is provided which is adapted to be mounted on a tripod or other suitable supporting surface, the remaining portions of the apparatus being pivotally supported by said frame member, directly or indirectly, for tilting movement in a vertical plane in a direction toward or away from a suitable fixed light source. Tilting of the frame-supported structure, simulating seasonal inclination of the earth, is provided by turning a threaded screw mounted on the frame member and linked to the remaining portions of the apparatus through a yoke pivoted on a nut which travels along the rod as the latter is turned. The degree of tilting movement of the apparatus relative to the supporting frame member registers on a scale indexed for the months of the year, thereby permitting accurate seasonal inclination of the structure from the perpendicular, in a plane which is aligned with the beams from the light source.

Rotatably mounted above the frame member on a shaft rotatably connected with said yoke is a generally horizontally main platform as well as a wheel indexed about its periphery with the 24 hours of the day. Said wheel turns with the main platform and thus enables the operator to turn the platform to any angular position with reference to the light source, which accords with a selected hourly setting.

Pivotally mounted atop the main platform is a subplatform which serves to support a model of the structure, or other form with reference to which the light and shadow study is to be made. This subplatform can be tilted to any position from horizontal to vertical which accords with the desired latitudinal setting, said tilting also being effected by means of a screw mounted on the main platform the screw being linked to the tiltable subplaform through an arm which is pivotally connected at one end to the under surface of said subplatform and at the other to a nut which travels along the screw as the latter is turned. A pointer arm carried by the nut travels along a scale calibrated to show the degree of latitude corresponding to any given tilting of the subplatform.

With the apparatus of this invention, any generally fixed external light source, including the sun may be used which is capable of giving off generally parallel rays to illuminate the structural model under study. There is, perhaps, no satisfactory parallel ray artificial light source suitable for this purpose and so the same is approximated without lessening the value of the results or the accuracy of the instrument.

Further objects are to provide a construction of maximum simplicity, economy, and ease of manufacture, also such further objects, advantages and capabilities as will fully appear and as are inherently possessed by the device and the invention described herein.

Invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawings:

FIG. 3 is a sectional view partially broken away, taken along the line III—III of FIG. 4.

FIGS. 4 and 5 are sectional views taken along the lines IV—IV and V—V respectively of FIG. 3.

Figure 6:
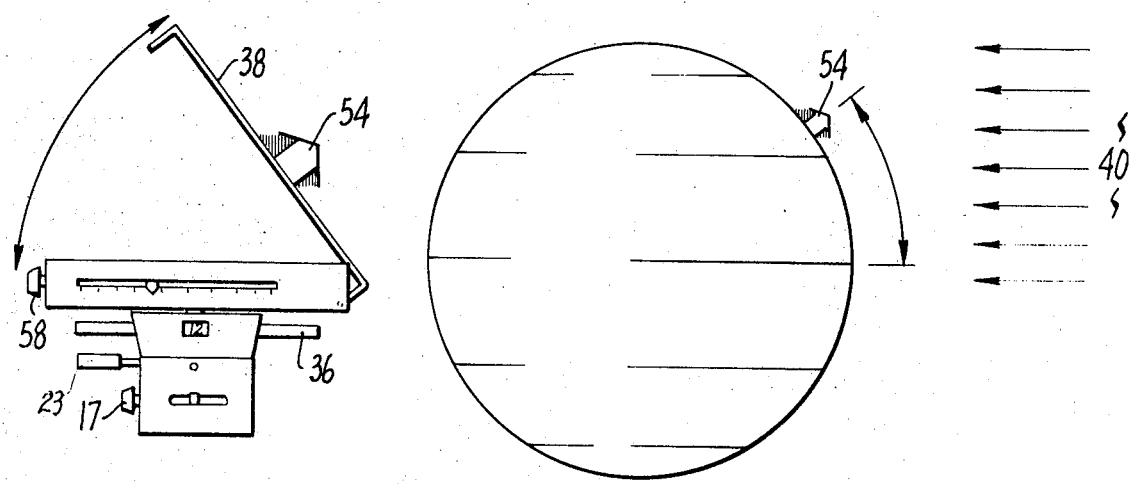

FIG. 6 shows, from left to right, a side elevation of the apparatus, to a reduced scale, with a structural model positioned on the support platform which is adjusted to a noonday setting and a latitude of 53° the longitudinal axis of the device being in a vertical position characteristic of the earth's inclination in March and September; a view of the earth with the model positioned thereon at the time, latitude and season herein defined; and a light source simulating the sun shining on the model both as represented on the earth and on the apparatus.

Figure 7:
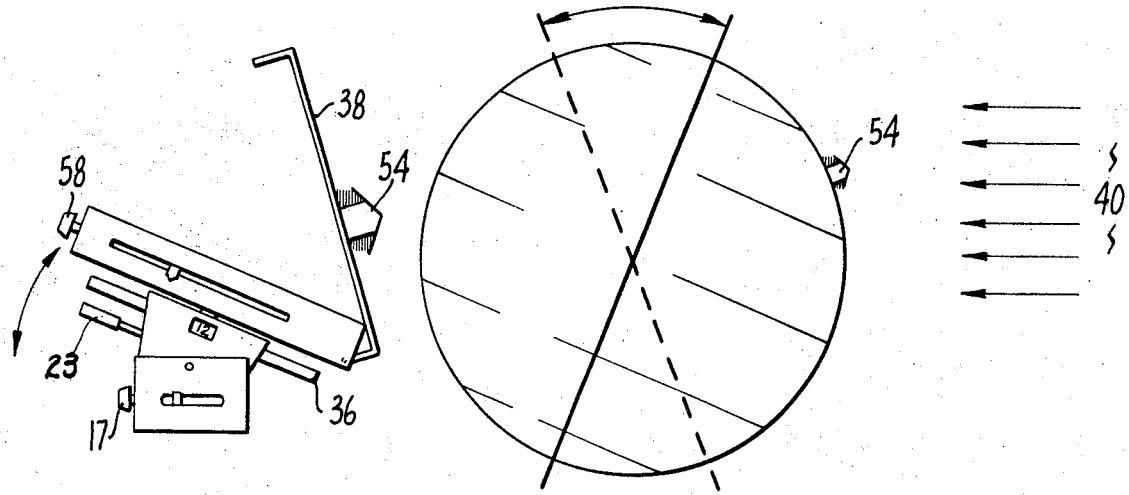
Figure 8:
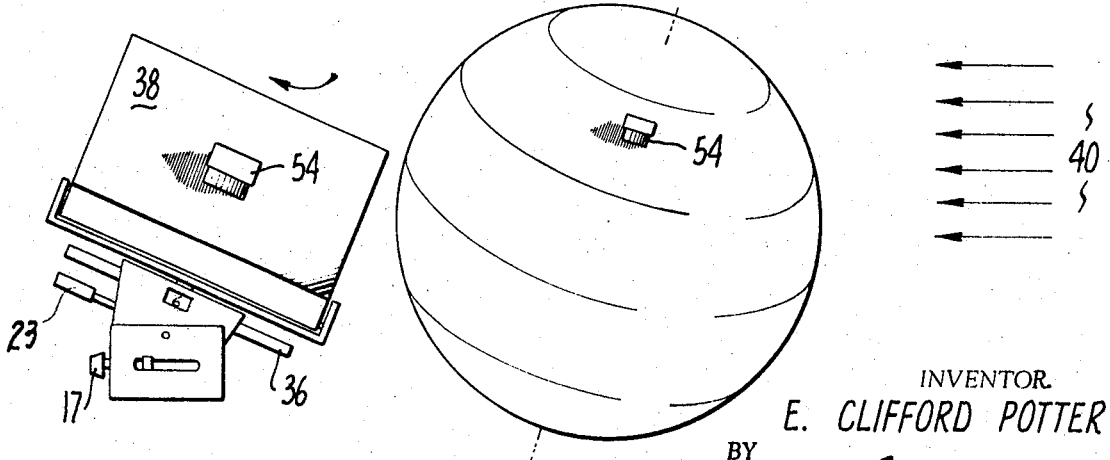

FIG. 7 is a view similar to that of FIG. 6 except that here the inclination of the apparatus and that of the earth accords with a June setting, the doted line on the earth indicating the setting for December; and FIG. 8 is a view similar to that of FIG. 7 except that the subplatform supporting the model has been turned to correspond with a setting for 6 o'clock in the morning.

DESCRIPTION OF THE PREFERRED EMBODIMENTS

Figure 1:
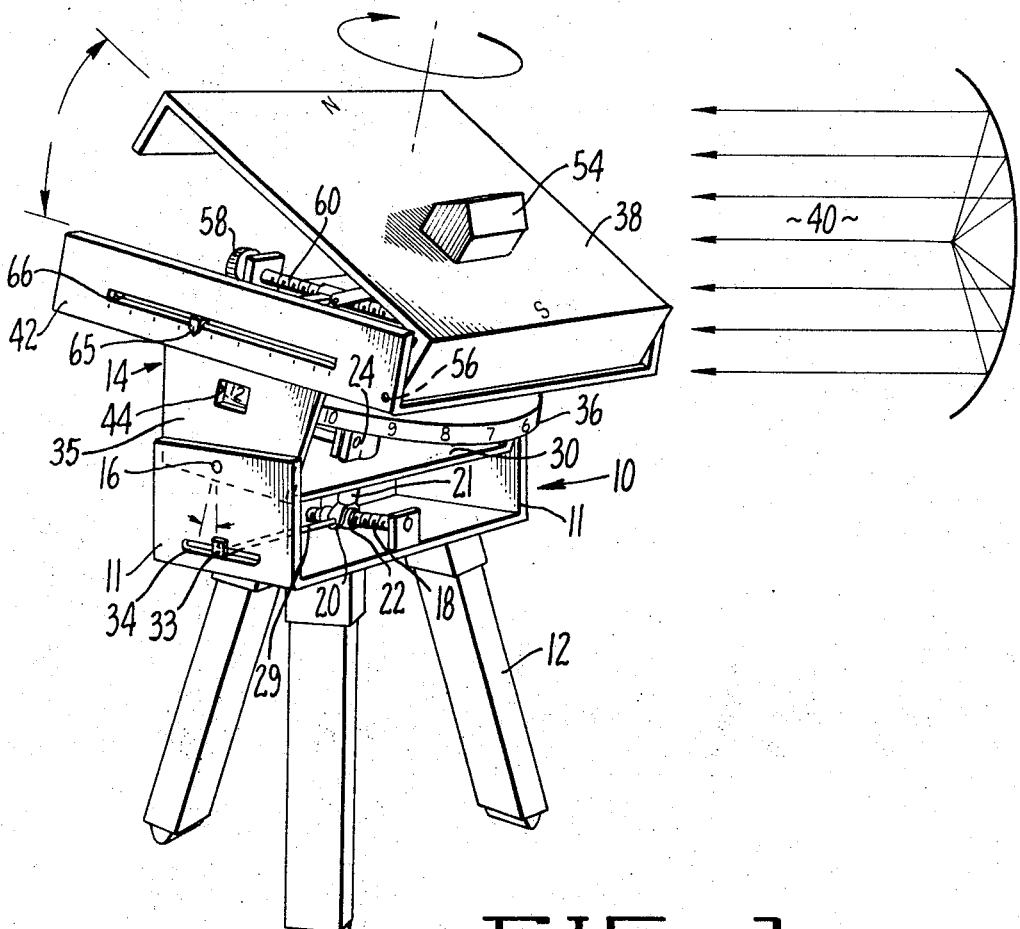
FIG. 1 is a view in perspective of an architectural shadow indicator embodying the features of the present invention and showing a structural model placed on the apparatus and casting a shadow as illuminated by a light source.

Referring now to FIG. 1, there is shown an embodiment of this invention comprising a U-shaped frame 10 mounted on a tripod stand 12 or other suitable frame, said frame having upstanding opposite sides 11. The frame 10 remains in fixed position during use. For accurate results the base of frame 10 should be as level as possible. Pivotally supported between the upstanding sides 11 of the frame 10 is an open rectangular member generally indicated at 14 the depending sides 35 of which are pivotally mounted to sides 11 to pivot about pivot points 16. This pivotal movement in a vertical plane by which the vertical axis of the mounting device and of the apparatus supported thereby is tilted to correspond to inclination of the earth for any month, or seasonal inclination, is controlled by turning knob 17 at one end of a threaded rod 18 rotatably mounted on the frame 10, the tilting movement being transmitted through a yoke 20 (seen more particularly in FIGS. 4 and 5) which is pivoted on a threaded nut 22 on said rod. Secured to the upper portion of yoke 20 is a pin 21 which rotatably and slidably engages within the bore of a support hub or axle 26 which is journalled within central openings in the top and bottom panels 28 and 30 of said mounting device 14. The lower end of hub 26 is supported by bottom panel 30 while the upper end thereof passes through upper panel 28 and is fixedly secured within a central opening 31 in the bottom of a main platform 32 which is mounted above and in parallel relation to panel 28.

Figure 2:
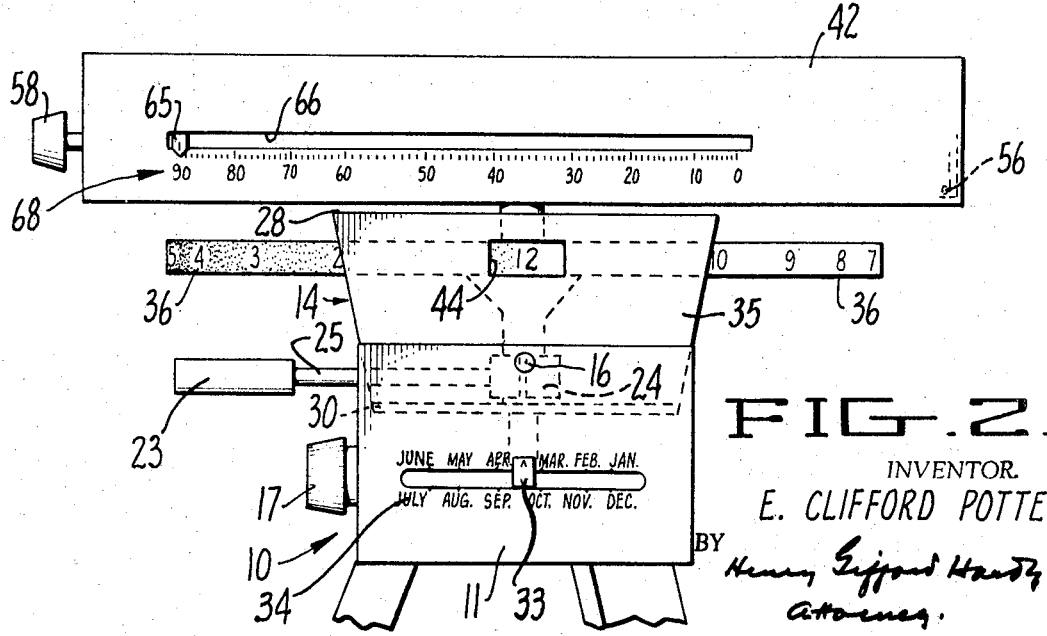
FIG. 2 is a side elevation of the apparatus showing the adjacent placement of the several seasonal, hourly and latitudinal scales thereon.

Monthly (seasonal) indicator markings, as indicated at 34 in FIGS. 1 and 2, are provided on side panel 11 of mounting frame 10. By moving the mounting member 14 on the pivots 16 of its supporting structure 10 in a vertical plane either toward or away from the light source 40 so as to bring the indicator 33 into alignment with any selected month or season of the scale 34 and the apparatus will assume the precise seasonal declination selected. The indicator 33 is mounted at the outer end of the indicator arm 29 which is rigidly attached at its under end to the threaded nut 22 and moves with it in response to the rotation of knob 17.

A wheel 36, indexed about the periphery of its downwardly turned flange with numbers corresponding to the twenty-four hours of the day, the daylight hours being white and the night hours shaded, is fixedly mounted about the support hub 26 for rotation therewith and at right angles thereto between the panels 28 and 30 of the member 14. Wheel 36, along with the main platform 32 secured to hub 26 and support platform 38 pivotally mounted thereon, can be turned or rotated with reference to a fixed light source 40, so as to bring whatever the angular disposition of said platforms 32 and 38 may be into a setting which accords with any selected hour of the day.

In the form of the apparatus illustrated in the drawings, the beams of light from the light source 40 parallel the reference plane established by the side members 11 of base 10 and walls 35 of mounting member 14. When side panels 42 of platform 32 are aligned with this reference plane both the platform 32 and support platform 38 are at the noonday setting as indicated by the hourly reference numeral 12 which appears in a window 44 in wall member 35 above the seasonal markings 34 in wall 11.

Wheel 36 is rotated by manually moving the platform 32 to the desired setting and so it may be secured at any selected hourly setting by means of a split ring locking 24, shown particularly in FIGS. 3 and 5. The split ring 24 may be tightened around hub 26 or loosened, as required for rotation, by turning the knob 23 of rod 25. Turning the wheel 36 from a 12 o'clock to a 6 o'clock setting effect a 90° turn of the platform members 32 and 38.

The support platform generally designated 38, serves to position a structural model 54 to be illuminated by light source 40. This platform is pivotally (or hingedly) mounted at one side thereof to the platform 32 at pivot points 56. Tilting movement of support platform 38 provides the desired latitudinal adjustment of the device and is controlled by turning knob 58 connected to the threaded rod 60 which is rotatably mounted and journaled in bosses 59 mounted on platform 32 below support platform 38. The turning movement of threaded rod 60 is transmitted to the support platform 38 through a travelling nut 62 which is internally threaded to move along rod 60. One end of linkage 64 is pivotally connected with the nut 62 while the other end is pivotally connected to a boss 63 secured to the underside of the support platform 38. Linkage 64 is an inverted U-shaped member with cut out portion at each end to allow free movement of the linkage to clear bosses 59 at each end. The latitude in degrees which corresponds with any given tilting of support platform 38 is indicated by a pointer 65 carried by nut 62 which extends at a right angle to threaded rod 60 into and guides in a horizontal slot 66 cut in the wall 42. A latitude scale 68 ranging from 0° to 90° is marked along the length of slot 66, and pointer 65 moves from a 90° position to a 0° position on this scale as the support platform 38 is raised from the horizontal toward the vertical position.

OPERATION

In operation, the structural model 54 under study is first securely mounted on the upper surface of the support platform 38 and the apparatus is aligned with the light source so that frame 10 is in parallel relationship with the light beams 40 striking the model. The knob 17 is then turned until the inclination of the apparatus with respect to the vertical accords with the selected monthly or seasonal setting, as read on scale 34. The adjustment for June is shown in FIG. 7. A latitude adjustment is then made by turning the knob 58 and thus tilting the support platform 38 until the pointer 65 reaches the selected point on latitude scale 68. The adjustment for latitude 53° only is shown in FIG. 6. Lastly, the wheel 36 is rotated so as to set the model at the angle with respect to the light source which accords with the selected time of the day as read through window 44 on the hourly scale inscribed about the periphery of wheel 36. The complete adjustment is shown in FIG. 8.

It will be observed from the above description that the various adjustment means provided in the apparatus are easily accessible and permit a precise adjustment even by unskilled operators. The settlings all have direct readout and the several seasonal, hourly and latitude scales are all presented on a single face of the apparatus. The apparatus is accurate even though it is of a rugged, compact, trouble-free construction. At the same time, it is so disposed as to be portable and that means that when necessary it may be placed on any convenient table, tripod or other supporting surface. Preferably it is more useful to have it secured to its own tripod.

I claim:

1. Apparatus for determining the shadow pattern cast by a fixed light source on a model comprising: a frame; a mounting device pivotally mounted on said frame for adjustable tilting movement in a vertical plane and in a direction toward or away from said light source, the tilted position of said mounting device corresponding to that of the earth's axis at a selected seasonal inclination; a main platform rotatably mounted on said mounting device and tilting therewith, said main platform being arranged to be adjustably rotated to an angular position with reference to the light source which accords with the selected hourly setting; and a support platform on which a model is positioned, said support platform rotating with the said main platform and being pivotally mounted on said main platform for tilting movement relative thereto, said support platform being arranged to be adjustably tilted to an inclination which corresponds to a selected position of latitude on the earth at any selected axial inclination thereof.

2. The apparatus defined by claim 1 including: means responsive to tilting movement of said mounting device to indicate the season which corresponds to any given tilting adjustment, together with means for adjusting the mounting device to any desired tilted position.

3. The apparatus as defined by claim 1 including: means responsive to tilting movement of said support platform to indicate the latitude of the earth corresponding to any inclination of said support platform relative to said main platform.

4. The apparatus as defined by claim 1 including: means responsive to rotation of said main platform and support platform to indicate the time of day corresponding to any angular adjustment with respect to the light source made by rotating the main platform and the support platform, together with means for releasably locking the main platform and support platform into any position of rotational adjustment.

5. The apparatus as defined by claim 1 including: a threaded rod rotatably mounted on said frame in alignment with the plane of tilting movement of said mounting device; a yoke pivoted at its lower end to a nut threaded on said rod; and a support axle about which said mounting device is mounted, said axle being journalled with respect to said device and being secured at its upper end to said main platform; the lower end of said axle being provided with a longitudinal bore in which the upper end of the yoke is slidably and rotatably engaged, whereby said axle is tilted into any position of adjustment as said yoke is threaded along the rod as the latter is rotated.

6. The apparatus as defined by claim 1 wherein said support platform is pivotally mounted at an end portion thereof to the main platform and wherein the apparatus includes: a threaded rod rotatably mounted on said main platform beneath said support platform and aligned with the plane of tilting movement of the latter, said rod having a nut threaded thereon; and an arm pivotally mounted at one end to said nut and at the other end to the underside of a midportion of said support platform whereby the latter is tilted to the desired position of adjustment as said nut is moved along the rod by the rotation thereof.

References Cited
UNITED STATES PATENTS
3,090,124  5/1963  Fruhling.

FOREIGN PATENTS
48,008   8/1889   Germany.
216,316  11/1909  Germany.
641,854  7/1962   Italy.

ROBERT B. HULL, Primary Examiner